United States Patent [19]

Nakayama

[11] Patent Number: 4,756,021
[45] Date of Patent: Jul. 5, 1988

[54] TELEPHONE SET

[75] Inventor: Yasunobu Nakayama, Hachioji, Japan

[73] Assignee: Kabushiki Kaisha Toshiba, Kawasaki, Japan

[21] Appl. No.: 843,274

[22] Filed: Mar. 24, 1986

[30] Foreign Application Priority Data

Mar. 28, 1985 [JP] Japan .................................. 60-64826

[51] Int. Cl.⁴ ............................................ H04M 9/00
[52] U.S. Cl. ..................................... 379/388; 379/424
[58] Field of Search ............... 379/388, 387, 389, 390, 379/420, 419, 424

[56] References Cited

U.S. PATENT DOCUMENTS

| | | | |
|---|---|---|---|
| 4,068,135 | 1/1978 | Sonobe et al. ....................... | 307/352 |
| 4,158,112 | 6/1979 | Cerbone et al. ................. | 379/388 X |
| 4,365,118 | 12/1982 | Lindman et al. ..................... | 379/420 |
| 4,496,799 | 1/1985 | Kingen et al. .................. | 379/388 X |
| 4,497,980 | 2/1985 | Gorman et al. ................. | 379/387 X |
| 4,550,226 | 10/1985 | Teater .............................. | 379/387 X |
| 4,608,462 | 8/1986 | Blomely et al. ...................... | 379/390 |

FOREIGN PATENT DOCUMENTS

| | | | |
|---|---|---|---|
| 2132447 | 7/1984 | United Kingdom ................ | 379/424 |
| 2154820 | 9/1985 | United Kingdom ................ | 307/311 |

OTHER PUBLICATIONS

"Loudspeaker Equipment for Key Telephone", I. Yamagami et al., Japan Telecommunications Review, Jan. 1982, pp. 29–33.

*Primary Examiner*—Jin F. Ng
*Assistant Examiner*—R. Vaas
*Attorney, Agent, or Firm*—Banner, Birch, McKie & Beckett

[57] ABSTRACT

A telephone set which has a hands-free mode of operation is disclosed. The telephone set includes a telephone circuit connector to a handset and a hands-free circuit connected to a loudspeaker. A hook switch is mechanically operated in accordance with operation of the handset. A semiconductor switch is connected in parallel with the hook switch and is controlled by a control circuit. The telephone circuit or hands-free circuit is selectively connected to a pair of telephone lines through the hook switch or the semiconductor switch.

11 Claims, 6 Drawing Sheets

TELEPHONE SET

BACKGROUND OF THE INVENTION

This invention relates to a telephone set, and more particularly is directed to an improved telephone set having a loud speaker and a conventional handset.

A conventional telephone set usually includes a ringing circuit, a telephone circuit, a handset and a hook switch. When the telephone set is in an idle state, i.e., waiting to be used, the ring circuit is connected to a pair of telephone lines by the hook switch so that a ring signal from the telephone exchange or local central office can be detected. When the ring signal is detected, a bell or other alarm or indicator is activated to signal an incoming call. When the telephone user responds to an incoming call or wishes to make a call and picks up the handset, the hook switch disconnects the telephone lines from the ringer circuit and connects them to the telephone circuit. The user may then complete the telephone call. In this embodiment of a conventional telephone apparatus, the hook switch is automatically operated by the operation of the handset.

In recent years, telephone sets have been developed which have a loud-speaker and associated circuitry in addition to the conventional circuitry mentioned above. Thus the telephone user can hear the conversation without using the telepone handset. Other telephone sets have been developed which have a speaker/microphone. A speaker/microphone permits the telephone user to freedom to move about a room while still carrying on a telephone conversation. It also allows several persons to be involved in the conversation at the same time.

Figure 1:
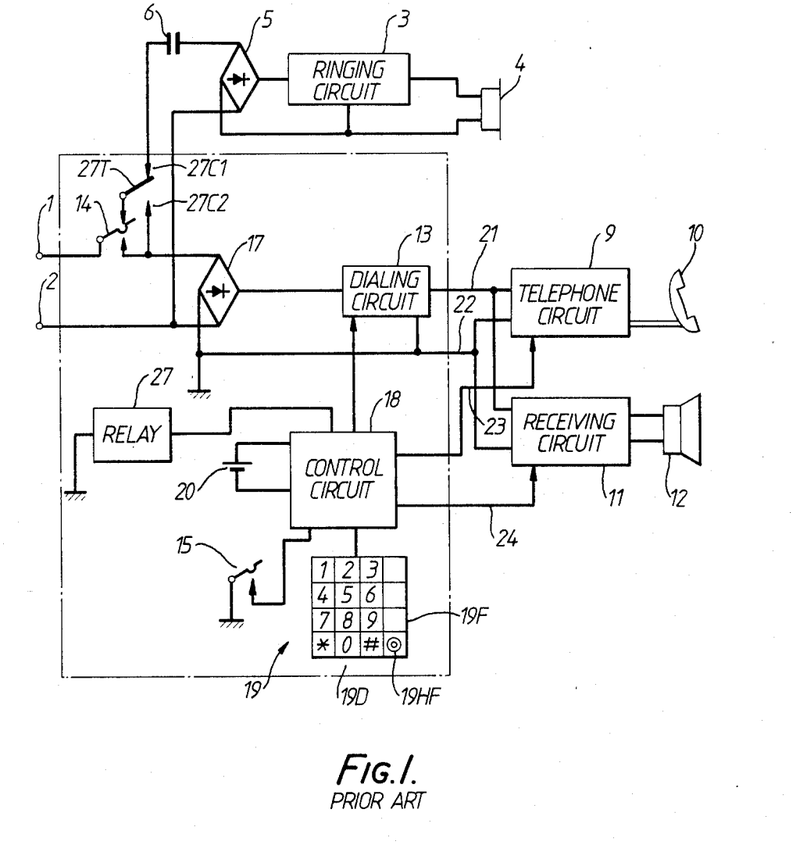
FIG. 1 shows a block diagram of a prior art telephone set.

One embodiment of a conventional telephone set is shown in block diagram form in FIG. 1. In FIG. 1, telephone lines 1 and 2 are normally connnected to ringing circuit 3 through first hook switch 14, relay contact 27T of relay 27, capacitor 6 and diode bridge circuit 5. Ringing circuit 3 detects the presence of a signal from the telephone exchange or local central office. The signal is converted to a ring tone or other indicator by sounder 4. When the telephone user picks up handset 10 to respond to an incoming call or wishes to place a call, first hook switch 14 and second hook switch 15 are activated. Hook switches 14 and 15 are always activated together inr esponse to taking handeset 10 off its hook. The automatic operation of hook swithces 14 and 15 is performed by a linkage (not shown) as is well known int he art. The operation of first hook switch 14 causes telephone lines 1 and 2 to be disconnected from ringing circuit 3 and to be connected to telephone circuit 9 through first hook switch 14, diode bridge circuit 17 and dialing circuit 13. Control circuit 18 generates a control signal which enables telephone circuit 9 when second hook switch 15 is activated. Consequently, the user can talk into telephone lines 1 and 2 through handset 10. The user may also dial a desired telephonenumber using dial keys 19. Control circuit 18 provides a control signal which causes dialing circuit 14 to generate respective dial tones which are sent to the telephone exchange when dial key 19D are activated by the user.

The telephone set further includes speaker 12 and receiving circuit 11. Speaker 12 permits the telephone user to hear the telephone conversation without the aid of handset 10. Thus, the telephone set may be used in a hands-free mode. When the telephone user desires to use speaker 12, the hands-free mode is selected by, e.g., operating one of dial keys 19, i.e., dial key 19HF. In response to the operation of dial key 19HF, circuit 18 generates a control signal which causes relay 27 to operate. Relay 27 includes relay contacts 27T which are operated to move from first contact point 27CI to second contact point 27C2 and to cause receiving circuit 11 to operate. Telephone lines 1 and 2 are thus connected to receiving circuit 11 through switch 14, relay contact 27T, second contact point 27C2, diode bridge circuit 17 and dialing circuit 13. The user then hears the activity taking place within the telephone system on speaker 12. Thus, when a party being called answers the phone, the user may pick up the handset 10 to begin the conversation. When handset 10 is removed from it shook, the connection of telephone lines 1 and 2 is changed from receiving circuit 11 to telephone circuit 9 in accordance with control signals from controlling circuit 18 as described above. Thus, the user may engage in an ordinary telephone conversation using handset 10.

In the above embodiment of a conventional telephone set, the receiving circuit is used for hands-free receiving. However, any other hands-free circuit may be used as well.

In the telephone set described above, a relay is used to switch the connection of telephone lines 1 and 2 between receiving circuit 11 and telephone circuit 9. A relay, however, takes a relatively large amount of space and is high in cost. Moreover, a relay has a rather short life span and can not be depended on for extended reliable operation. Thus, there is a need in the art for a more reliable telephone set.

SUMMARY OF THE INVENTION

It is an object of the present invention to provide a telephone set which is small-sized, has a long life and which is low in cost.

It is another object of the present invention to provide a telephone set which can be used even if a portion of the telephone set malfunctions.

These and other objects of the present invention are achieved by providing telephone set which includes a loudspeaker, a handset, a telephone circuit and a hook switch. The hook switch operates automatically when the handset is removed from its craddle or hook. The telephone apparatus further includes a semiconductor switch connected to the telephone lines in parallel to the hook switch and includes at least one loudspeaker and associated circuitry.

BRIEF DESCRIPTION OF THE PREFERRED EMBODIMENT

Figure 2:
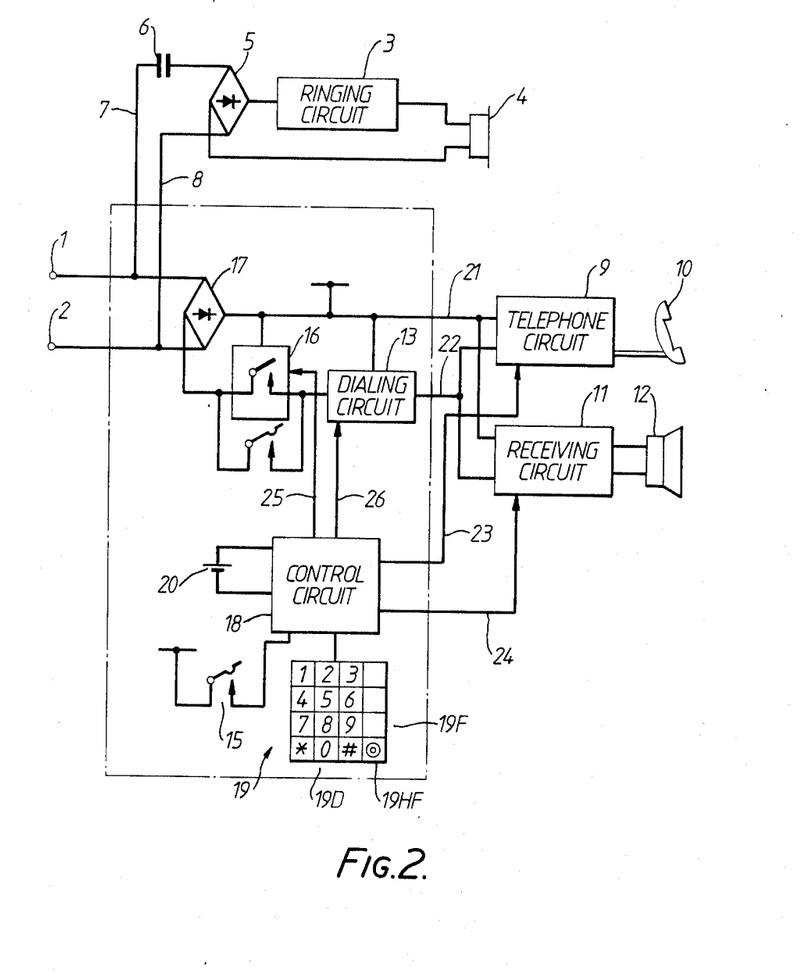
FIG. 2 shows a block diagram of a telephone set according to the invention.

In FIG. 2, telephone lines 1 and 2 are shown connected to a telephone set which includes ringing circuit 3, sounder 4, diode bridge circuit 5 and capacitor 6. Ringing circuit 3 is connected to telephone lines 1 and 2 through diodes bridge circuit 5 and capacitor 6 by signal lines 7 and 8. A DC voltage is usually applied to telephone lines 1 and 2 by the telephone exchange. In order to ring the telephone set, the exchange sends a ring signal along lines 1 and 2 by superimposing a AC voltage on the DC line voltage. Capacitor 6 blocks transfer of the DC voltage but allows the AC voltage to pass diode bridge circuit 5. Diode bridge circuit 5 rectifies the AC voltage to a DC voltage which is applied to ringing circuit 3. Ring circuit 3 thus generates a control signal which is applied to sounder 4. Sounder 4 converts the control signal into sound or some other indication to alert the called party to answer the telephone.

The telephone set further includes telephone circuit 9, handset 10, eceiving circuit 11, speaker 12, dialing circuit 13, first hook switch 14 having a contact, second hook switch 15 having a contact, semiconductor switch 16, diode bridge circuit 17, control circuit 18, keys 19 and battery 20. One side of telephone circuit 9 is coupled to telephone lines 1 and 2 through diode bridge circuit 17, hook switch 14, dialing circuit 13 and signal lines 21 and 22. The other side of telephone circuit 9 is coupled to handset 10. Telephone circuit 9 transfers siganls between signal lines 21 and 22 and handset 10. The transfer operation is controlled by a control signal from control circuit 18 via signal line 23 in an on-off manner. In the on-state, telephone circuit 9 transfers the signals between signal lines 21 and 22 and handset 10 as described above. In the off-state, however, no signals are transferred in any direciton. Thus, signal lines 21 and 22 are substantially disconnected.

Receiving circuit 11 which is also coupled to signal lines 21 and 22, includes several amplifiers which amplifies the signal from the signal lines. The amplified signal is then applied to loudspeaker 12 where it is converted into sound. The operation of the amplifier is controlled by a control signal from control circuit 18 via signal line 24 in an on-off manner. In the on-state, signal lines 21 and 22 are connected to receiving circuit 11 and in the off-state is disconnected.

Diode bridge circuit 17 serves to identify the polarity of the DC voltage which is applied to telephone lines 1 and 2 by the telephone exchange. When direct current flows between the output terminals of diode bridge circuit 17, any AC signal, such as a voice signal, is transferable bi-directionally through the diode bridge as is well known.

Hook switch 14 and semiconductor 16 are disposed in parallel between diode bridge circuit 17 and signal line 22. Hook switches 14 and 15 are activated in accordance with the operation of handset 10 by a mechanical linkage (not shown), i.e., when handset 10 is removed or returned to its craddle or hook. The on-off state of semiconductor switch 16 is controlled by a control signal from control circuit 18 via signal line 25 as described below. An important feature of the present invention is that the semiconductor switch is provided in parallel withthe hook switch between the telephone lines and the signal lines to which the telephone circuit and the receiving circuit is selectively connected.

Dialing circuit 13, which has a switching transistor as described below, transmits dial pulses to the telephone exchange in accordance with a control signal from control circuit 18 via signal line 26. The on-off indication of hook switch 15, i.e., an indication whether handset 10 is on or off its craddle or hook, is provided to control circuit 18. Keys 19 include dial keys 19D and function selecting keys 19F; one of which is hands-free receiving key 19HF. The operation of keys 19 is also provided to control circuit 18. Control circuit 18, which has a CPU as described below, generates the above described control signals through execution of a stored computer program to control the telephone set according to various input signals.

The operation of the telephone set of the present invention will now be described. In the waiting state, i.e., where the telephone set is in an idle condition waiting to be used, hook switches 14 and 15 and semiconductor switch 16 are in an off-state as shown in FIG. 2. Telephone circuit 9 and receiving circuit 11 are both disabled. When a telephone ring signal is received from the telephone exchange via telephones lines 1 and 2, the ring signal is converted into a ring sound by sounder 4 as described above. When the user picks up handset 10 to respond to the incoming call, hook switches 14 and 15 are activated, thus causing controlling circuit 18 to generate control signals for dialing circuit 13 and telephone circuit 9. Telephone circuit 9 is connected to telephone lines 1 and 2 whereby the user can carry on a conversation with the calling party. At the conclusion of the call, the user returns handset 10 to its craddle or hook and the telephone set returns to an idle state.

When the user wishes to place a telephone call, he may do so in the conventional manner or by using the hands-free receivng mode. If the hands-free mode is desired, the user operates hands-free mode key 19HF. Control circuit 18 detects the operating of key 19HF and in response thereto, generates control signals which enable semiconductor switch 16, dialing circuit 13 and receiving circuit 11. Receiving circuit 11 is, therefore effectively connected to telephone lines 1 and 2. Accordingly, a dial tone signal is received from the telephone exchange and is converted into sound by loudspeaker 12. If the user operates dial keys 19D in order to dial a telephone number, control circuit 18 generates a control signal which controls the formation of dial pulses as each key is operated. The dial pulses which are generated by dialing circuit 13 are transferred to the telephone exchange in the form of on-off interruptions of the telephone line loop circuit. Thus, semiconductor switch 16 controlled by control circuit 18 to operate on and off in synchronism with the pulses generated by dialing circuit 13. During transmission of the dial pulses, receiving circuit 11 generates a signal corresponding to the dial pulses which is converted into sound which is heard by the user. Thus, the user is able to hear each of dial keys 19D as they are activated. When the party being called responds, his voice signal is converted into sound by loudspeaker 12. Then, the user may begin the telephone conversation. At this time, control circuit 18 generates control signals which disable receiving circuit 11 and semiconductor switch 16 and enables telephone circuit 9. Thus, the telephone set may be made to operate in the hands-free receiving mode. In this embodiment of the present invention, hands-free operation may be enhanced by the use of a microphone circuit to eliminate the need for the user to speak into handset 10.

Semiconductor switch 16 requires a minimum voltage to maintain it in an on state. If the voltage between telephone lines 1 and 2 decreases below this minimum voltage, semiconductor switch 16 switches to an off state. Should this occur when the telephone set of the present invention is being used, the user may continue using the telephone by using handset 10 since hook switch 14 is mechanically operated in accordance with the operation of handset 10. Therefore, the user is assured of always being able to use the telephone.

Figure 3:
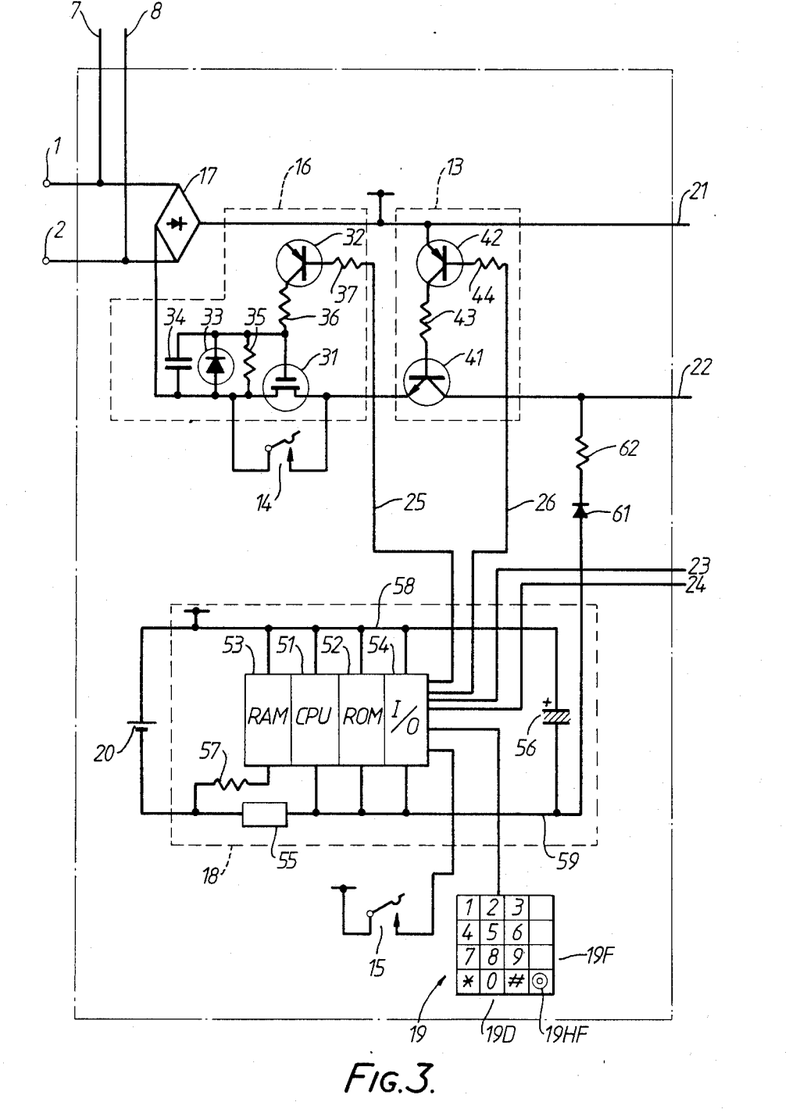
FIG. 3 shows the main elements of a first embodiment of the present invention.

FIG. 3 shows in more detail the elements surrounded by the dashed line in FIG. 2. As shown in FIG. 3, semiconductor switch 16 includes N-type MOSFET (Metal oxide semiconductor field effect transistor) 31, P-N-P type junction transistor 32, regulator diode 33, capacitor 34 and resistors 35, 36, and 37. An N-type MOSFET is used for transistor 31 because it can be used to switch relatively high voltages. The source terminal of MOSFET 31 is connected to the negative output terminal of diode bridge circuit 17 and the drain terminal is connected to signal line 22 through dialing circuit 13. Transistor 32 is connected to ground along with the positive output terminal of diode bridge circuit 17 and signal line 21. The collector terminal of transistor 32 is connected to the gate terminal of MOSFET 31 through resistor 36 and the base terminal of transistor 32 is connected to signal line 25 through resistor 37. Capacitor 34 serves to filter noise from MOSFET 31 to prevent its erroneous operation. Regulator diode 33 serves to protect MOSFET 32 from electrical surges.

Dialing circuit 13 includes N-P-N-type junction transistor 41, P-N-P-type junction transistor 42 and resistors 43 and 44.

Control circuit 18 includes CPU 51, ROM 52, RAM 53, I/O 54, limiter 55, capacitor 56 and resistor 57. A computer program is stored in ROM 52 which is executed by CPU 51 for controlling the operation of the telephone set. Changeable customer data needed to execute the program stored in ROM 52 may be stored in RAM 53. I/O 54, which has a plurality of registers, transfers input information with respect to the operation of hook switch 15 and keys 19 to CPU 51 and outputs control signals to signal lines 23, 24, 25 and 26 in accordance with the control operation performed by CPU 51. Battery 20 is also provided and is connected to power source lines 58 and 59. Electric power from batter 20 is continuously supplied to RAM 53 via resistor 57 and to CPU 51, ROM 52 and I/O 54 via limiter 55. Electric power from the telephone exchange is also applied to these elements when the telephone set is in actual use. When the telephone set is in an idle state, the electric power is provided to CPU 51 and RAM 57 by battery 20 via limiter 55. Diode 61 and resistor 62 are provided for the purpose of connecting power source line 59 and signal line 22 from the telephone exchange to the aforementioned circuit elements. The supply of electric power from the telephone exchange is interrupted during the transmission of dial pulses from the telephone set to the exchange. Accordingly, capacitor 56 is provided for the purpose of serving as a temporary power source during the dialing period.

Figure 4:
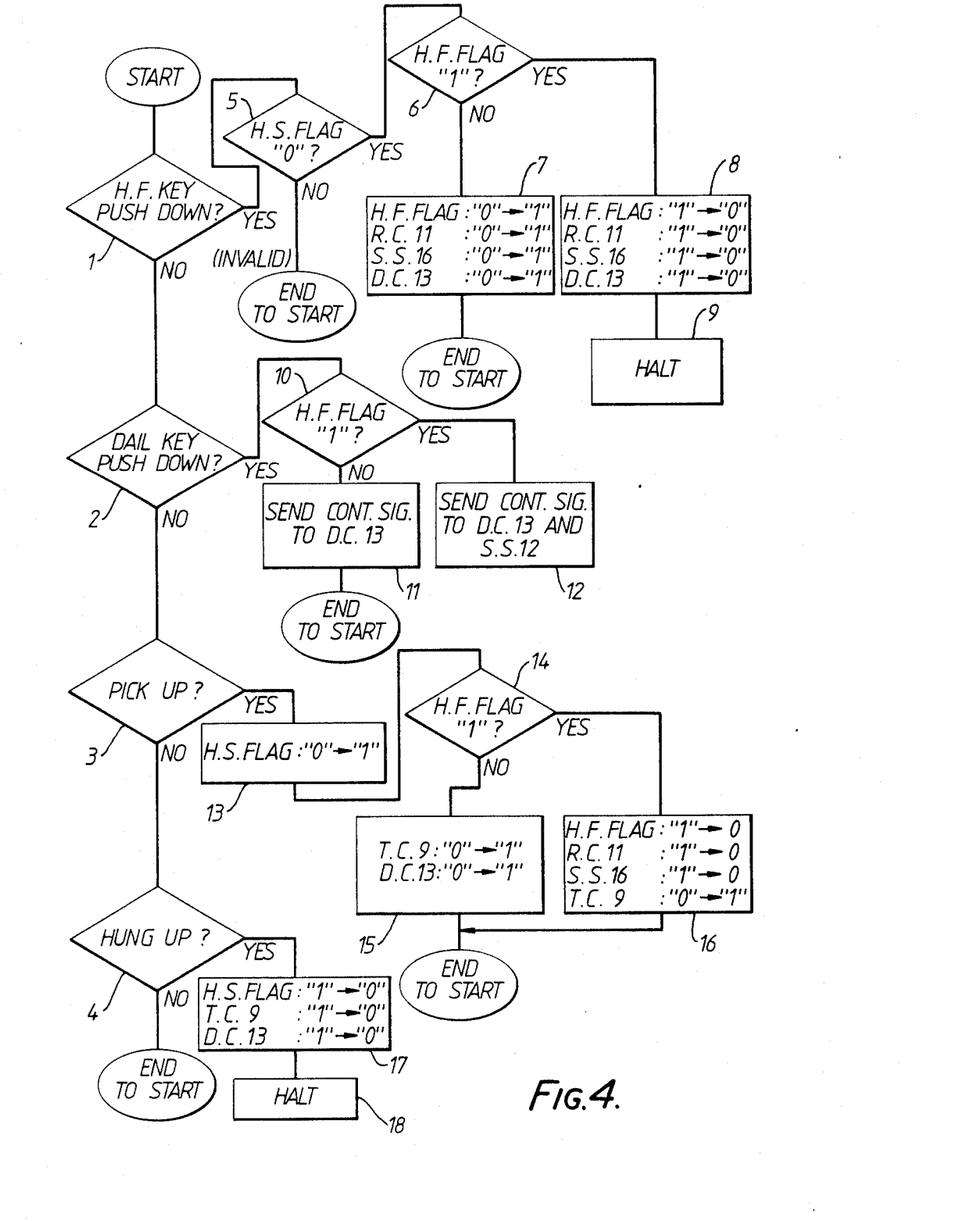
FIG. 4 shows a flow chart of program executed by control circuit 18 in FIG. 2.

FIG. 4 shows a flow chart of the computer program to be executed by CPU 51. CPU 51 remains in an idle state until I/O 54 detects the operation of hook switch 15 or hands-free receiving key 19HF. CPU 51 then executes the computer program according to the flow chart. Int he case where the user picks up the telephone handset to respond to or to make a call, CPU 51 detects the operation of the hook switch ("Yes" at set 3). After setting an HS flag from "0" to "1" (step 13), CPU 51 determines the status of the HF flag (step 14). If the HF flag is "0", CPU 51 outputs control signals which enable telephone circuit 9 and dialing circuit 13 (step 15). During this time, semiconductor switch 16 is in an off state. CPU 51 then returns to the beginning of the flow chart.

When dial keys 19D are operated, CPU 51 recognizes this condition at step 2 and then determines whether the HF flag is set (step 10). If the HF flag is not set, CPU 51 outputs a control signal to dialing circuit 13 (step 11). At the end of a telephone conversation when the user hangs up, (step 4) CPU 51 resets the HS flag and outputs a control signal which disables telephone circuit 9 and dialing circuit 13 (step 17). CPU 51 then enters a halt state (step 18).

The telephone user operates hands-free receiving key 19HF to make a call using the hands-free receiving mode, CPU 51 recognizes this condition (step 1) and then determines whether the HS flag is set (step 5). If the HS flag is not set, CPU 51 goes to step 6. Should the user operate hands-free receiving key 19HF after handset 10 has been picked up, CPU 51 returns to the start of the flow chart. In step 6, CPU 51 determines whether the HF flag is set. If the HF flag is not set, CPU 51 set it, then outputs a control signal which enables receiving circuit 11, semiconductor switch 16 and dialing circuit 13 (step 7). CPU 51 then returns to the start of the flow chart.

In the case where the users has completed dialing the telephone number and the called party has answered the phone, the user then picks up the telephone handset. In this case, CPU 51 recognizes the operation of the dial keys (step 2) and determines whether the HF flag is set (step 10). Since the HF flag is set, CPU 51 outputs a control signal to enable dialing circuit 13 and semiconductor switch 16 (step 12). When the called party answers his telephone, the user picks up the telephone handset and begins the conversation. CPU 51 recognizes this condition at step 3 and sets up the HS flag (step 13). CPU 51 then determines whether the HF flag is set (step 14). Since the HF flag is set, CPU 51 resets it to 0 then outputs a control signal which disables receiving circuit 11 and semiconductor switch 16 and also outputs a control signal which enables telephone circuit 9 (step 16). During this time, dialing circuit 13 is abled. At the end of the telephone call and the user hangs up, CPU 51 recognizes this condition at step 4. After executing step 17, CPU 51 enters the halt state shown in step 8.

In the case where the user operates the hands-free receiving key a second time to interrupt a call in progress, CPU 51 recognizes this condition (step 1). Since the HS flag is not set and the HF flag is set, CPU 51 goes to step 8 after steps 5 and 6. CPU 51 resets the HF flag then outputs a control signal which disables receiving circuit 11, semiconductor switch 16 and dialing circuit 13 CPU 51 then enters the halt state shown in step 9.

As described above, when hands-free receiving key 19HF is operated, control signals are provided by control circuit 18 which controls the operation of semiconductor switch 16 and dialing circuit 13. These control signals are negative voltages in the embodiment of the invention shown in FIG. 3. In response to a control signal, transistor 37 of semiconductor switch 16 turns to an on state. Accordingly, the voltage between the positive and negative terminals of diode bridge circuit 17 is applied to the gate and source terminals of MOSFET 31 whereby MOSFET 31 is turned on. Similarly, transistor 42 of dialing circuit 13 is turned on because its base current flow from ground to emitter to base resistor 44 to signal line 26 to I/O 54 to capactior 56 and then to ground. This causes switching transistor 41 to turn on. The base current after MOSFET 31 and transistor 41 are turned on is supplied by the telephone exchange, i.e., the base current for transistors 37 and 41 flown in a path formed by the positive terminal of diode bridge circuit 17; the emitter of the respective transistor; the base of the respective transistor; respective resistors 37 and 44; I/O 54; power source line 59; diode 61; resistor 62; transistor 41; MOSFET 31 and the negative temrinal of diode bridge circuit 17.

As described before, in the case where dialing occurs during the hands-free receiving, the control signals for semiconductor switch 16 and dialing circuit 13 are of the on-and-off pulse type. The base currents of transistor 32 and 42 during the dialing sequence continually flow in synchronism with the control signals. Therefore, switching transistors 41 and MOSFET 31 are controlled in an on-and-off manner. Thus, the requisite dial pulses are transferred to the telephone exchange.

When the telephone handset is picked up, a control signal for dialing circuit 13 is output from control circuit 18 as described before. In this situation, semiconductor switch 16 is to be ignored because hook switch 14 has been activated. The operation of the dialing circuit is the same as described above.

Figure 5:
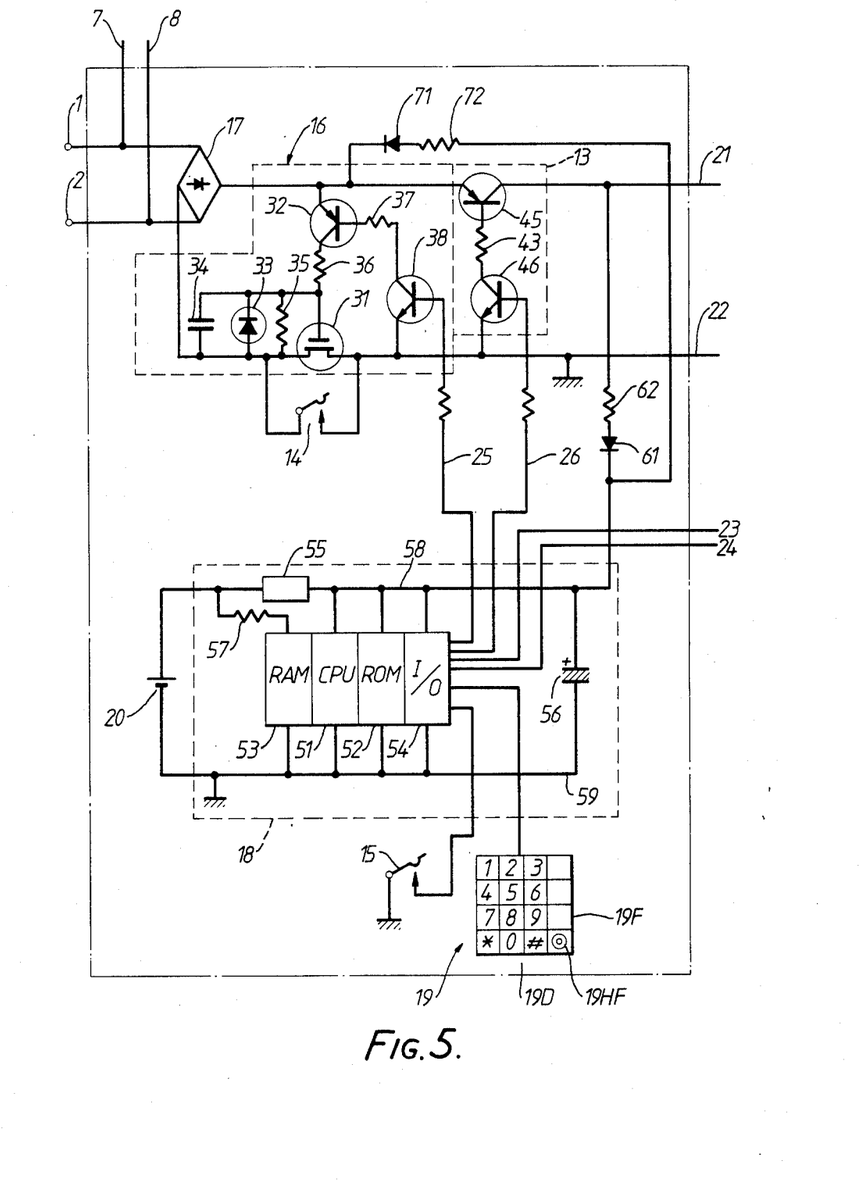
FIG. 5 shows the main element of a second embodiment of the present invention.

FIG. 5 shows a detailed circuit diagram of a second embodiment of the invention. Semiconductor switch 16 and hook switch 14 are connected in parallel with each other. The primary difference between this embodiment of the invention and the embodiment described above is the polarity of the power source. In this embodiment, the ground side of the power source is the negative side, i.e., a positive power source. In the previous embodiment, the ground side of the power source was positive, i.e., a negative power source. To provide for a change in polarity of the power source, N-P-N junction transistor 38 is addded to semiconductor switch 16. In addition, an P-N-P type transistor is used for switching transistor 45 of dialing circuit 13 and is inserted in signal line 21 rather than signal line 22. An N-P-N type transistor is also used for transistor 46 and is connected to signal line 22 rather than signal line 21. Diode 61 and resistor 62 are also connected between signal line 21 and power source line 58. Diode 71 and resistor 72 are additionally connected between the emitter terminal of transistor 32 and power source line 58.

In this embodiment of the invention, the base current of transistor 38 flows in a path which includes capacitor 56; I/O 54; signal line 25; the base emitter junction of the transistor; and capacitor 56. The base current of transistor 32 before MOSFET 31 turns on flows in a path which includes capacitor 56; resistor 72; diode 71; the emitter base junction of resistor 37; transistor 46; ground and capacitor 56. Consequently, transistor 32 and MOSFET 31 are turned on. The base current of transistor 46 flows in a path similar to that of transistor 38. Thus, transistor 45 turns on. The base current of transistors 38 and 46 after MOSFET 31 and transistor 45 turn on is supplied by the telephone exchange.

Figure 6:
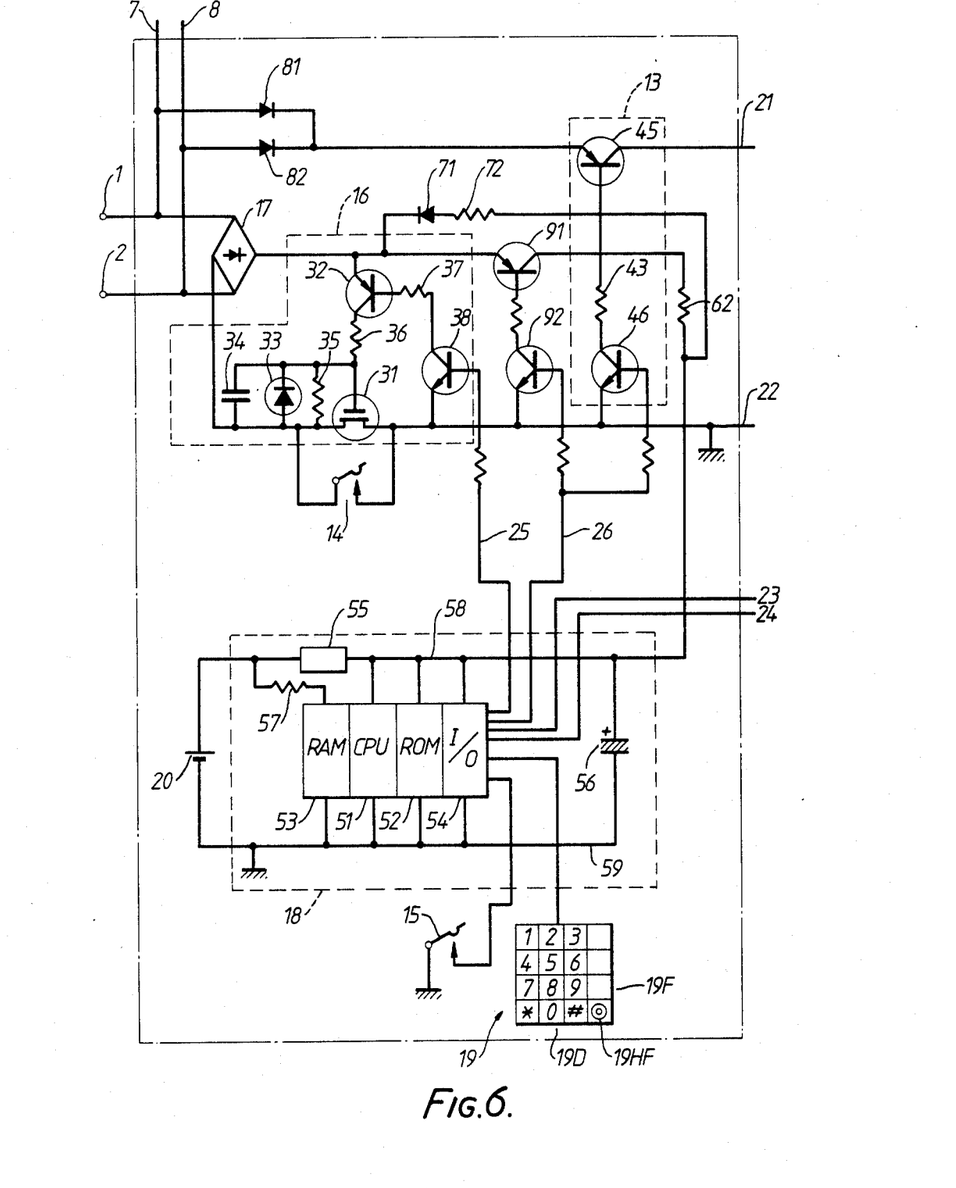
FIG. 6 shows a main portion of a third embodiment of the invention corresponding to dashed-line portion in FIG. 2.

FIG. 6 shows a detailed circuit diagram of a third embodiment of the present invention. Semiconductor switch 16 and hook switch 14 are also connected in parallel to each other in this embodiment. The primary difference between this embodiment of the invention and the above described embodiments is the manner in which the electric power from the telephone exchange is supplied to control circuit 18. In the previous embodiments, diode 61 is provided for the purpose of prohibiting a leak of current to the telephone circuit and the receiving circuit. The forward voltage drop of diode 61 is about 0.7 volts. The voltage across the telephone lines is decreased when a plurality of telephones are used at the same time. The voltage which is used to provide power for control circuit 18 when the telephone set is being used should be supplied from the telephone exchange as much as possible to prevent battery 20 from being drained. For this reason, diode 61 in FIGS. 3 and 5 is removed.

In the present embodiment, signal line 21 is separated from the out-put side of diode bridge circuit 17 and is directly connected to telephone lines 1 and 2 by diodes 81 and 82. Switching transistor 45 is disposed within signal line 21. Instead of removing the diode, transistor 91 is provided with control transistor 92 and resistor 93. The voltage between the collector and emitter terminals of the transistor is lower than that of the diode by about 0.6 volts than when the transistor is in an on state. The same control signal is applied to both control transistors 92 and 46. The operation of semiconductor switch 16 and dialing circuit 13 is similar to that of the embodiment of the present invention shown in FIG. 5.

While in the foregoing specification, several embodiments of the present invention have been set forth for the purpose of making a complete disclosure, it will be apparent to those skilled in the art that numerous changes may be made without departing from the spirit and principles of the invention. The present invention is only limited by the scope of the appended claims.

What is claimed is:

1. A telephone set adapted to be coupled to a telephone line and having a telephone circuit, a hands-free circuit for operating said telephone set in a hands-free mode, a handset connected to said telephone circuit and a speaker connected to said hands-free circuit, said telephone set comprising:

a mechanical switch having a contact actuatable by said handset to operatively connect said telephone circuit to said telephone line, semiconductor switch means disposed between said telephone line and said hands-free circuit in parallel with said mechanical switch for operatively connecting said hands-free circuit to said telephone line, said semiconductor switch means being operative to connect said hands-free circuit to said telephone line only when the voltage of said telephoneline is above a predetermined level; input means for inputting hands-free mode selection information; and control means responsive to the hands-free mode selection information and the state of said handset for controlling the operation of said semiconductor switch means wherein said control means controls the semiconductor switch means to turn on when the hands-free mode selection information is inputted and to turn off when said handset is picked up.

2. The telephone set according to claim 1 wherein said telephone set further includes dial circuit means coupled to said telephone line in series with said parallel connection of said mechanical switch and said semiconductor switch means for dialing a telephone number, wherein said semiconductor switch means and said dial circuit means are controlled to be cut off continuously and synchronously by said control means when a user is dialing a telephone number while said telephone set is being used in said hands-free mode.

3. The telephone set according to claim 1 wherein said telephone set further includes a diode bridge circuit disposed between said telephone line and said parallel connection of said mechanical switch and said semiconductor switch means, said diode bridge circuit having a positive output terminal and a negative output terminal, and polarizing current from the direction of said telephone line.

4. The telephone set according to claim 1 wherein said semiconductor switch means comprises a field effect transistor for performing switching operation and a junction transistor for controlling the switching operation of said field effect transistor.

5. The telephone set according to claim 3 wherein said semiconductor switch means comprises an N-type MOS field effect transistor with its source terminal and drain terminal coupled to said negative output terminal of said diode bridge circuit and to said hands-free circuit, respectively, and a P-N-P type junction transistor wherein its emitter terminal, its collector terminal and its base terminal are coupled to said positive output terminal of said diode bridge circuit, the gate terminal of said N-type MOS field effect transistor and said control means, respectively.

6. The telephone set according to claim 5 wherein said telephone set further includes a battery for said control means, wherein said positive output terminal of said diiode bridge circuit and the positive terminal of said battery are connected to a ground potential, and said control means applies a negative control voltage to said base terminal of said P-N-P type junction transistor when said telephone set is operating in the hands-free mode.

7. The telephone set according to claim 6 further inclduing a diode wherein the negative terminal of said battery is coupled to a junction between said drain terminal of said N-type MOS field effect transistor and said hands-free circuit by said diode.

8. The telephone apparatus according to claim 3 wherein said semiconductor switch means comprises an N-type MOS field effect transistor the source and drain terminals of which are respectively connected to said negative output terminal of said diode bridge circuit and to said hands-free circuit, a P-N-P type junction transistor the emitter and collector terminal of which are respectively connected to the positive output terminal of said diode bridge circuit and to the gate terminal of siad N-type MOS field effect transistor, and an N-P-N type junction transistor the emitter, collector and base terminals of which are respectively connected to the base terminal of said P-N-P type junction transistor, to said source terminal of said N-type MOS field effect transistor and to said control means.

9. The telephone set according to claim 8 wherein said telephone set further comprises a battery for said control means and a first diode to connect said emitter terminal of said P-N-P type junction transistor to the positive terminal of said battery, wherein said control means applies a positive control voltage to said base terminal of said N-P-N type junction transistor.

10. The telephone set according to claim 9 wherein said telephone set further includes a second diode for supplying said control means with current from said telephone lines.

11. The telephone set according to claim 9 wherein said telephone set further includes a diode switch for coupling said telephone line to one or the other of said telephone circuit and said hands-free circuit in cooperation with said mechanical switch and said N-type MOS field effect transistor, and a resistor for supplying said control means with current from said telephone line.

* * * * *